(12) United States Patent
Sato et al.

(10) Patent No.: US 10,053,247 B2
(45) Date of Patent: Aug. 21, 2018

(54) BINDING APPARATUS

(71) Applicant: NICHIBAN CO., LTD., Tokyo (JP)

(72) Inventors: Masanori Sato, Tokyo (JP); Hiroki Matsushita, Tokyo (JP); Eri Moriyama, Tokyo (JP)

(73) Assignee: NICHIBAN CO., LTD., Tokyo (JP)

( * ) Notice: Subject to any disclaimer, the term of this patent is extended or adjusted under 35 U.S.C. 154(b) by 757 days.

(21) Appl. No.: 14/647,435

(22) PCT Filed: Nov. 26, 2013

(86) PCT No.: PCT/JP2013/081767
§ 371 (c)(1),
(2) Date: May 26, 2015

(87) PCT Pub. No.: WO2014/084205
PCT Pub. Date: Jun. 5, 2014

(65) Prior Publication Data
US 2015/0307216 A1   Oct. 29, 2015

(30) Foreign Application Priority Data

Nov. 29, 2012   (JP) .................................. 2012-261070

(51) Int. Cl.
*B65B 13/02* (2006.01)
*B65B 13/20* (2006.01)
(Continued)

(52) U.S. Cl.
CPC .......... *B65B 13/025* (2013.01); *A01G 17/085* (2013.01); *B65B 13/14* (2013.01);
(Continued)

(58) Field of Classification Search
CPC ........ A01G 17/085; A01G 17/08; A01G 9/12; B65B 13/025; B65B 13/14; B65B 13/20;
(Continued)

(56) References Cited

U.S. PATENT DOCUMENTS 1,413,768 A * 4/1922 O'Connor ............. B65B 13/025
                                                        254/246
4,419,930 A * 12/1983 Holland-Letz ........ B65C 9/1892
                                                          101/92
(Continued)

FOREIGN PATENT DOCUMENTS

JP   2002-284115 A   10/2002
JP   2004-161962 A   6/2004
(Continued)

OTHER PUBLICATIONS

Written Opinion from PCT/JP2013/081767 dated Feb. 18, 2014 and English Translation of comments.

*Primary Examiner* — Jimmy T Nguyen
(74) *Attorney, Agent, or Firm* — Porter Wright Morris & Arthur LLP

(57) ABSTRACT

A binding apparatus includes a pressure bonding mechanism in which pressure is applied by a pair of pressure bonding plates to a joining portion of a binding tape, which is an adhesive tape, to fasten it together by gripping and squeezing a pair of levers to rotate a pair of arms around a fulcrum. Thereby, any mixing of metal staples into an object to be bound as in a conventional binding apparatus is eliminated, and thus the quality of the object to be bound can be ensured. Further, the need for a strong grip strength like that when ejecting a staple is eliminated, and thus the burden on an operator can be reduced.

11 Claims, 10 Drawing Sheets

(51) Int. Cl.
  *B65B 13/24*    (2006.01)
  *B65B 13/32*    (2006.01)
  *B65B 13/14*    (2006.01)
  *B65B 27/00*    (2006.01)
  *A01G 17/08*    (2006.01)
  *B65B 13/30*    (2006.01)

(52) U.S. Cl.
  CPC .............. *B65B 13/20* (2013.01); *B65B 13/24* (2013.01); *B65B 13/327* (2013.01); *B65B 27/00* (2013.01); *B65B 13/305* (2013.01)

(58) Field of Classification Search
  CPC ..... B65B 13/327; B65B 13/24; B65B 13/305; B65B 27/00; C09J 5/00
  USPC .............. 100/16, 33 R, 33 PB; 156/468, 579
  See application file for complete search history.

(56) References Cited

U.S. PATENT DOCUMENTS

| | | | | |
|---|---|---|---|---|
| 4,559,766 A | * | 12/1985 | Matsushita | ............. B65B 67/06 53/370 |
| 4,610,067 A | * | 9/1986 | Hara | ........................ B65B 13/24 140/93 A |

FOREIGN PATENT DOCUMENTS

| | | |
|---|---|---|
| JP | 2006-050913 A | 2/2005 |
| JP | 2006-299101 A | 11/2006 |
| JP | 2007-054000 A | 3/2007 |
| JP | 2008-253194 A | 10/2008 |
| JP | 2010-274937 A | 12/2010 |

* cited by examiner

BINDING APPARATUS

TECHNICAL FIELD

The present invention relates to a binding apparatus, and particularly to a binding apparatus in which an object to be bound that is induced between a pair of arms is bound by binding tape that is stretched between the pair of arms by gripping and squeezing a pair of levers to rotate the pair of arms around a fulcrum.

BACKGROUND ART

Conventionally, a binding apparatus of a so-called plier-type, in which an object to be bound that is induced between a pair of arms is bound by binding tape that is stretched between the pair of arms by gripping and squeezing a pair of levers to rotate the pair of arms around a fulcrum, has been known. For example, Patent Literature 1 discloses a horticultural binder, in which an object to be bound is induced within a binding tape that is stretched between a head receiving part and a head part, and in this state, a joining portion of the binding tape is fastened by a staple ejected from the head receiving part by closing a clincher arm, and thereby the object to be bound is bound.

In the above-described horticultural binder, the object to be bound is bound by fastening a non-adhesive tape that is wound around the object to be bound with a staple. Thus, if the object to be bound is farm produce such as vegetables, the metal staple may get mixed into the farm produce, and this may cause problems with the quality of the farm produce. Further, a relatively strong grip strength is required when ejecting the metal staple, and thus the burden on the operator is large, and this has been a factor leading to reductions in work efficiency.

CITATION LIST

Patent Literature

Patent Literature 1: Japanese Patent Application Laid-Open (JP-A) No. 2007-54000

SUMMARY OF INVENTION

Technical Problem

Thus, the present invention was created in consideration of the above-described circumstances, and an object thereof is to provide a binding apparatus with which the quality of an object to be bound can be ensured by preventing any metal staples from mixing therein and the burden on an operator can be reduced.

Solution to Problem

To solve the above mentioned problem, a binding apparatus of the present invention includes: a pair of arms that are rotated around a fulcrum by gripping and squeezing a pair of levers; a tape supporting part that supports a binding tape so that it can be pulled out; a tape dispensing part that is provided on one arm and dispenses the binding tape that has been pulled out from the tape supporting part; and a tape retaining part that is provided on the other arm and retains an end of the binding tape that has been dispensed from the tape dispensing part, wherein an object to be bound that has been induced between the pair of arms is bound by the binding tape that is stretched between the pair of arms, the binding tape is an adhesive tape, and the binding apparatus further includes a pressure bonding mechanism in which a joining portion of the binding tape is pressure bonded by cooperation of a first pressure bonding member that is provided on the one arm and a second pressure bonding member that is provided on the other arm.

According to a binding apparatus of the present invention, in a so-called plier-type binding apparatus, an adhesive tape in which one side is an adhesive surface can be used as the binding tape. Thereby, any mixing of metal pieces such as a staple into the object to be bound is eliminated, and thus the quality of the object to be bound can be ensured. Further, according to a binding apparatus of the present invention, since the joining portion of the binding tape is fastened by the adhesive force of the adhesive surface of the binding tape, the need for a strong grip strength like that when ejecting a metal staple is eliminated when applying pressure to the joining portion of the binding tape with a pressure bonding mechanism. In addition, since a mechanism for ejecting a staple is no longer needed, the weight of the apparatus can be reduced. Thereby, the burden on the operator can be decreased, and in turn the work efficiency can be improved.

Advantageous Effects of Invention

According to the present invention, a binding apparatus with which the quality of an object to be bound can be ensured and the burden on an operator can be reduced can be provided.

DESCRIPTION OF EMBODIMENTS

Figure 1:
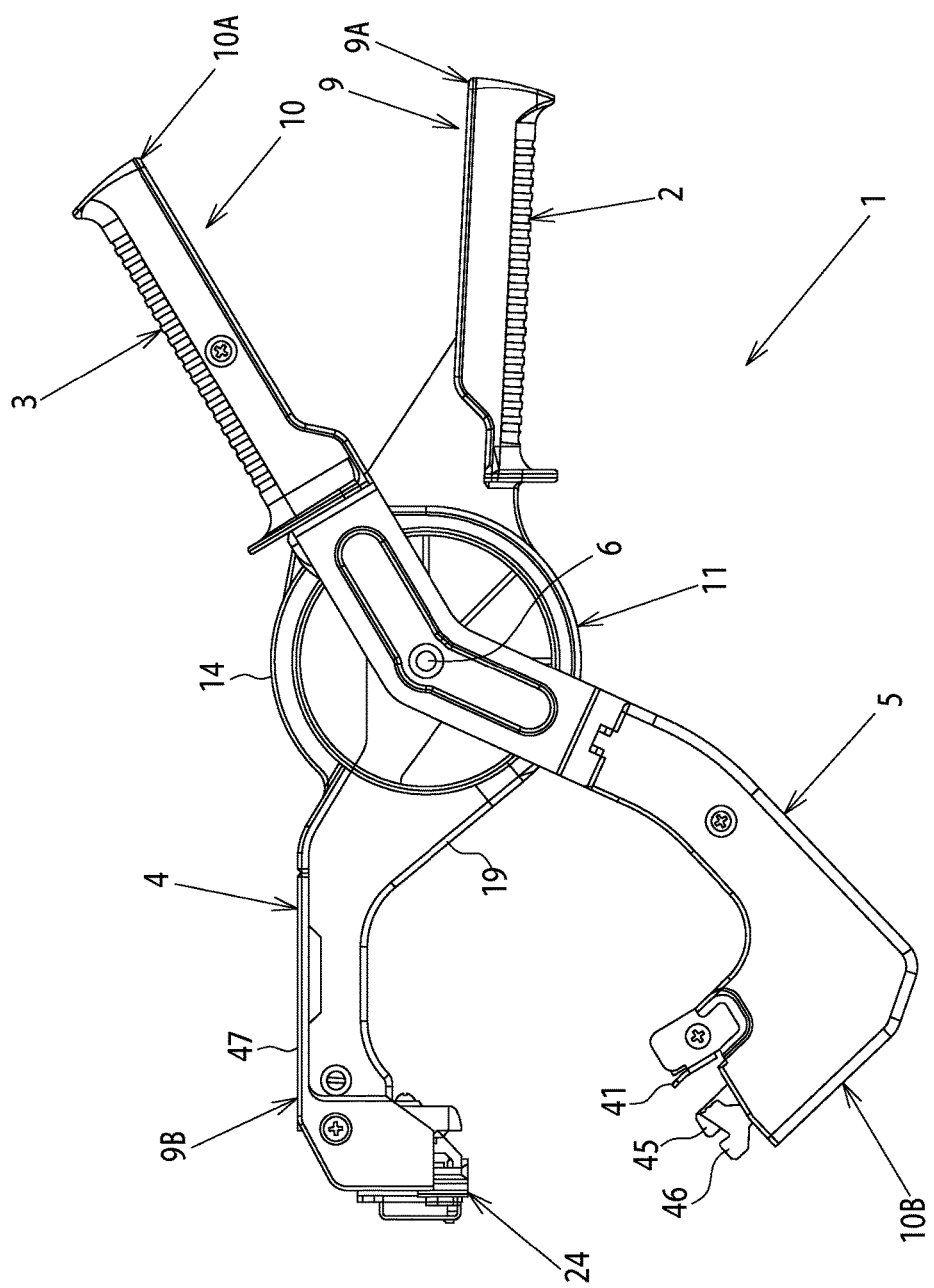
FIG. 1 is a side view of a binding apparatus according to an embodiment of the present invention.

An embodiment of the present invention will now be explained below referring to the drawings. For convenience, the upward direction (top side), downward direction (bottom side), leftward direction (left side), and rightward direction (right side) in FIGS. 1 and 2 will be defined as the upward direction (top side), downward direction (bottom side), leftward direction (left side), and rightward direction (right side). Further, a "plate" as used in the following explanation includes, other than a planar plate (flat plate), a three-dimensional plate obtained by subjecting a flat plate to processing such as bending.

A so-called plier-type binding apparatus 1 according to the present embodiment is illustrated in FIG. 1. The binding apparatus 1 is configured such that an object to be bound 7 (refer to FIG. 8) that is induced between a pair of arms 4 and 5 is bound by a binding tape 8 (refer to FIG. 2 or FIG. 8) that is stretched between the pair of arms 4 and 5 by gripping and squeezing a pair of levers 2 and 3 to rotate the pair of arms 4 and 5 around a fulcrum 6. The pair of levers 2 and 3 is biased around the fulcrum 6 by a spring (not illustrated) so that they return to the opened state shown in FIG. 1.

Figure 2:
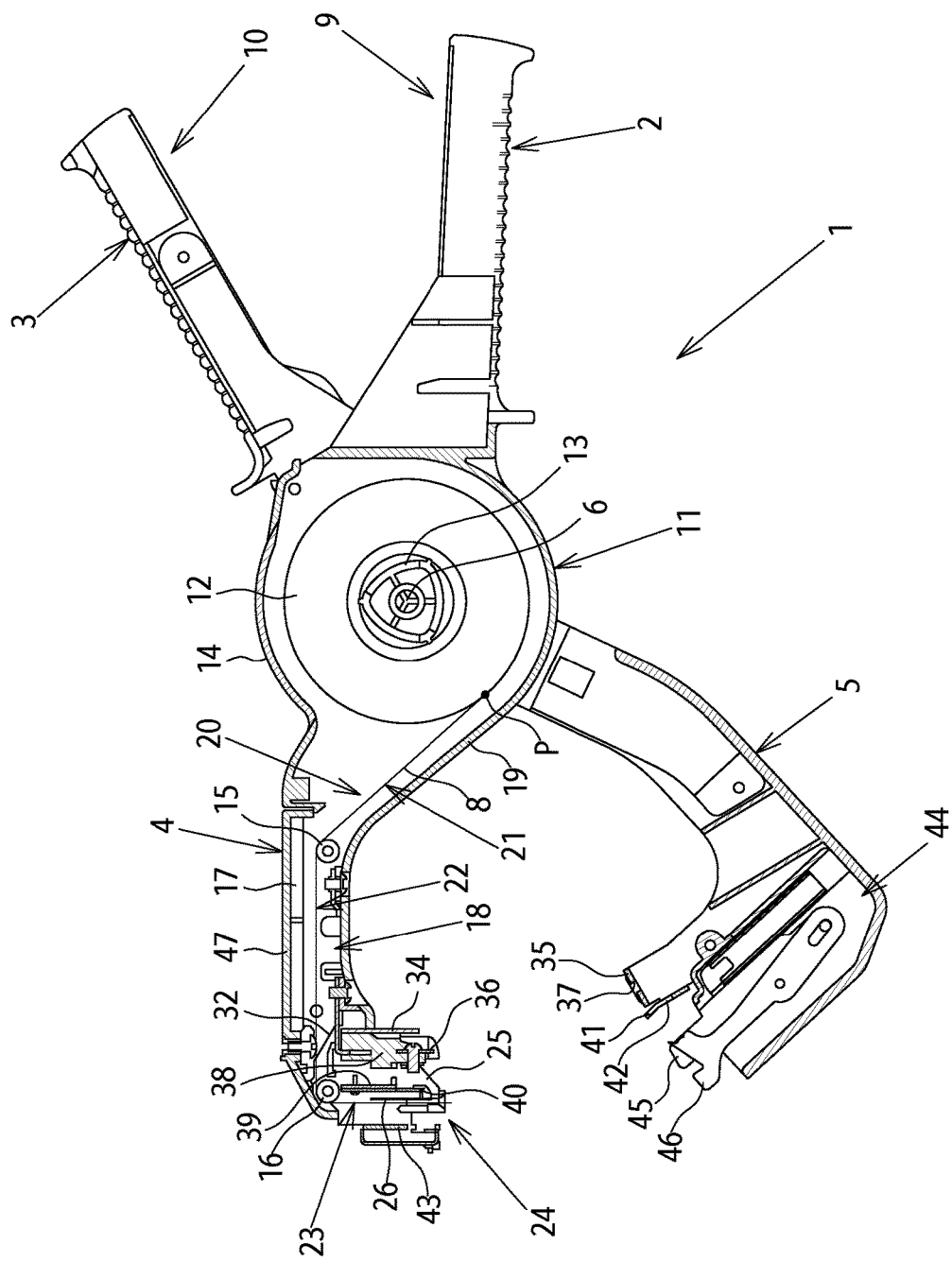
FIG. 2 is a cross-section view of the binding apparatus shown in FIG. 1.

As shown in FIGS. 1 and 2, the binding apparatus 1 includes a first base body 9 that extends in the leftward-rightward direction, and a second base body 10 that is assembled on the first base body 9 and can rotate around the fulcrum 6 relative to the first base body 9. The first base body 9 is constituted by a polycarbonate molded body, and therein a first lever 2 is formed on a base end part 9A side that is on the right side of the fulcrum 6 in FIG. 1, and a first arm 4 (one of the pair of arms 4 and 5) is formed on a distal end part 9B side that is on the left side of the fulcrum 6 in FIG. 1. Similarly, the second base body 10 is constituted by a polycarbonate molded body, and therein a second lever 3 is formed on a base end part 10A side that is on the right side of the fulcrum 6 in FIG. 1, and a second arm 5 (the other arm of the pair of arms 4 and 5) is formed on a distal end part 10B side that is on the left side of the fulcrum 6 in FIG. 1.

As shown in FIG. 2, the first base body 9 includes a spool 13 (tape supporting part) that supports the binding tape 8 that is wound around a tape reel such that it can rotate around a rotation center (support axis) that matches the fulcrum 6. Hereinafter, in order to differentiate it from the strip-shaped binding tape 8 that is pulled out from the tape reel, the binding tape 8 in a state in which it is wound around the tape reel (the binding tape 8 in a wound state attached to the tape reel) will be referred to as a reel tape 12. The reel tape 12 is set on the spool 13 such that it is rotated in the clockwise direction in FIG. 2 around the fulcrum 6 when the binding tape 8 is pulled out from the reel tape 12.

The reel tape 12 mounted on the spool 13 is accommodated in a tape accommodating part 11 that is formed between the first lever 2 and the first arm 4 of the first base body 9. The tape accommodating part 11 includes a first tape cover 14 (tape cover) that constitutes a top part of the tape accommodating part 11 and can be opened/closed. Thereby, in the binding apparatus 1, by opening the first tape cover 14 to form an opening in the top part of the tape accommodating part 11, the reel tape 12 can be inserted into the tape accommodating part 11 from the opening to mount the reel tape 12 on the spool 13. Fifty percent or more of the surface area of the first tape cover 14 is constituted by a transparent material such as polycarbonate. Further, in the state shown in FIGS. 1 and 2, i.e. the state in which the first lever 2 and the first arm 4 of the first base body 9 are disposed approximately horizontally, the first lever 2 is disposed at a lower position than the spool 13 and the first arm 4 is disposed at a higher position than the spool 13.

As shown in FIG. 2, the first base body 9 includes a first roller 15 and a second roller 16 that support a non-adhesive surface of the binding tape 8 that has been pulled out from the reel tape 12. The first roller 15 and the second roller 16 are provided on an upper side plate 18 attached to the inside of a side wall 17 of the first arm 4, and the first roller 15 is disposed on a base end side (right side) of the first arm 4 and the second roller 16 is disposed on a distal end side (left side) of the first arm 4.

Thereby, a tape path 20 including the following is formed: a first section 21 that extends from the reel tape 12 toward the first roller 15 along a second tape cover 19 that constitutes a bottom part of the first arm 4; a second section 22 that extends from the first roller 15 toward the second roller 16 in the left-right direction, or in other words extends from the base end side toward the distal end side of the first arm 4 in the lengthwise direction of the first arm 4; and a third section 23 that extends in the downward direction from the second roller 16, and through which the binding tape 8 that is dispensed from a tape dispensing part 24 to be explained later passes. A contact point P between the binding tape 8 that has been pulled out from the reel tape 12 and the reel tape 12, or in other words an end point on the spool 13 side of the binding tape 8 that has been pulled out from the reel tape 12, is disposed at a lower position than the second section 22 of the tape path 20.

Figure 3:
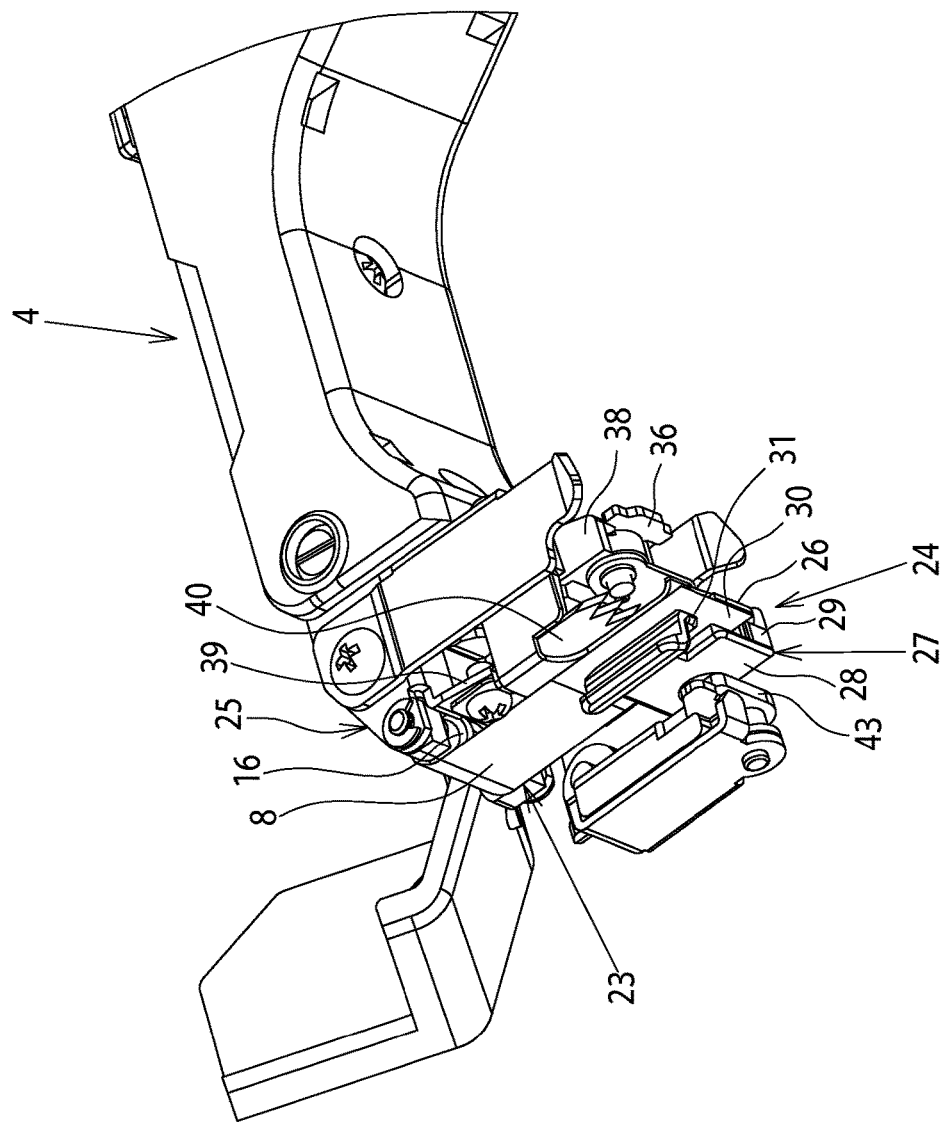
FIG. 3 is a perspective view of a first arm, and an explanatory view of a mechanism that is incorporated in a distal end thereof.

The tape dispensing part 24 is attached to an upper mechanism attachment plate 25 that is fixed to a left side end of the upper side plate 18, and is constituted by a first guide plate 26 (first guide part) that guides the non-adhesive surface (surface facing the right side in FIG. 2) of the binding tape 8 that extends from the second roller 16 and a second guide plate 27 that is formed in an approximate L-shape. As shown in FIG. 3, the second guide plate 27 includes a first guide piece 28 (second guide part) disposed facing the first guide plate 26, and in turn facing the adhesive surface of the binding tape 8, and a second guide piece 29 (third guide part) that guides one side (the side nearest the side wall 17) in the width direction of the binding tape 8 that passes between the first guide plate 26 and the first guide piece 28.

Thereby, in the binding apparatus 1 according to the present embodiment, by operating the binding tape 8 with a finger to slide the binding tape 8 to the side (in the width direction of the binding tape 8), the binding tape 8 is inserted into the tape dispensing part 24 from an opening 30 on one side of the tape dispensing part 24, or in other words an opening 30 that is opened to reveal the front surface of the second guide piece 29. A third guide piece 31 that is formed in an approximate L shape for facilitating the insertion of the binding tape 8 into the tape dispensing part 24 is provided on a side end part of the opening 30 of the first guide piece 28. The reference numeral 32 in FIG. 2 indicates a tape return preventing plate that contacts the non-adhesive surface of the binding tape 8 in order to prevent the binding tape 8 from moving (returning) from the second roller 16 toward the first roller 15 in the rightward direction.

Figure 9:
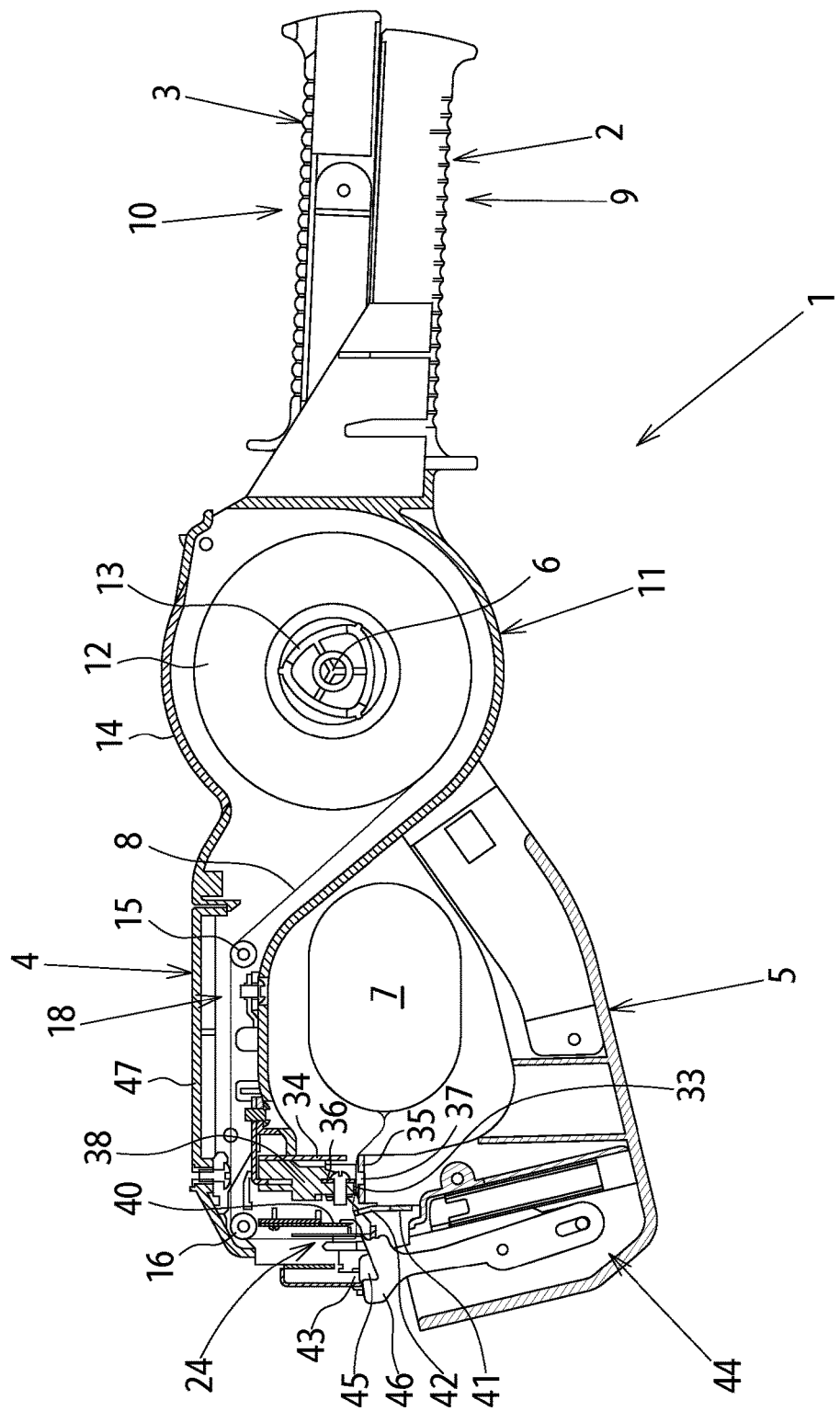
FIG. 9 is an explanatory view of the operation of the binding apparatus according to the embodiment, and illustrates a state in which the binding tape is constrained by a tape pressing plate on a first arm side upon causing the pair of arms to perform a closing operation from the state shown in FIG. 8.

The binding apparatus 1 includes a pressure bonding mechanism that applies pressure to pressure bond a joining portion 33 (refer to FIG. 9) of the binding tape 8. The pressure bonding mechanism includes a first pressure bonding plate 34 (first pressure bonding member) attached to the first guide plate 26, and a second pressure bonding plate 35 (second pressure bonding member) provided on the distal end of the second arm 5. A pressing surface is formed on a lower end surface of the first pressure bonding plate 34. The pressing surface is formed in a channel shape toward which the distal end side of the first arm 4, or in other words the tape dispensing part 24 side is opened. Meanwhile, a pressure-receiving surface of the second pressure bonding plate 35 that receives the pressing surface of the first pressure bonding plate 34 is formed in a rectangular shape, and a square hole 37 for receiving a convex portion on the distal end of a tape pressing plate 36 to be explained later is provided in the center of the pressure-receiving surface.

The tape pressing plate 36 is fixed to a movable plate 38 that is movably guided in the up-down direction by the first pressure bonding plate 34. The movable plate 38 is biased in the downward direction by a compression coil spring (not illustrated). The pressure bonding mechanism is configured such that the joining portion 33 of the binding tape 8 is pressure bonded and fastened together by applying pressure to the joining portion 33 of the binding tape 8 by the channel-shaped pressing surface of the first pressure bonding plate 34 and the pressure-receiving surface of the second pressure bonding plate 35. Further, the joining portion 33 of the binding tape 8 can be strongly gripped by lowering the tape pressing plate 36 from above the joining portion 33 of the binding tape 8 and inserting the convex portion on the distal end of the tape pressing plate 36 into the square hole 37 of the second pressure bonding plate 35. The gripping force on the binding tape 8 by the tape pressing plate 36 can be adjusted by the spring force of the compression coil spring that biases the movable plate 38.

Figure 10:
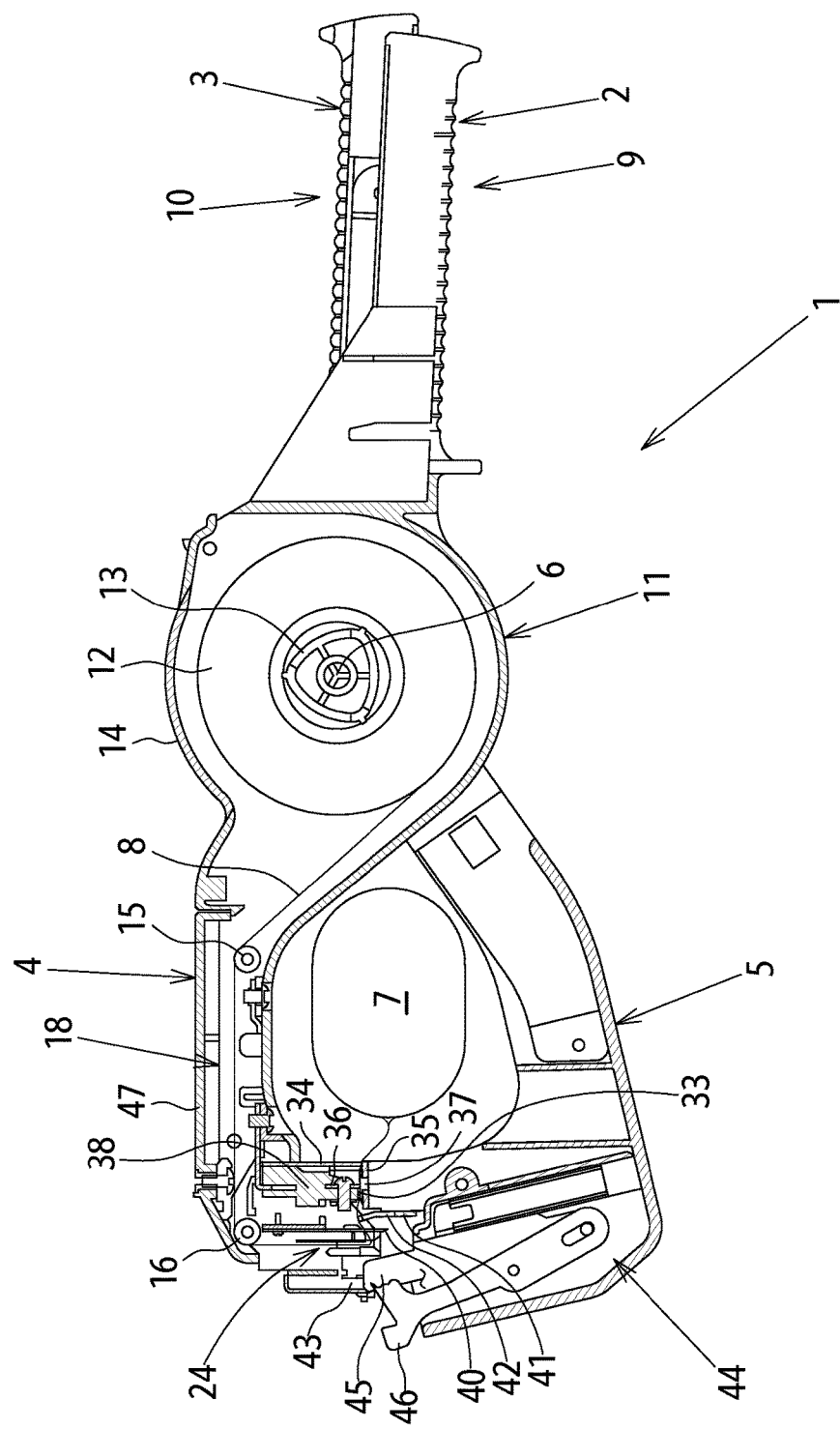
FIG. 10 is an explanatory view of the operation of the binding apparatus according to the embodiment, and illustrates a state in which pressure is applied to a joining portion of the binding tape by a pressure bonding mechanism and the binding tape is simultaneously cut near the joining portion by a cutting mechanism at a timing when the pair of arms has reached the rotation end position of the closing operation from the state shown in FIG. 9.

The binding apparatus 1 includes a cutting mechanism that cuts near the joining portion 33 (pressure bonded part) of the binding tape 8 that has been wound around the object to be bound 7. As shown in FIG. 3, the cutting mechanism includes a cutting blade 40 that is formed into a serrated blade and fixed to a cutting blade fixing plate 39. The cutting mechanism is configured such that the vicinity of the joining portion 33 of the binding tape 8 that is gripped by the tape pressing plate 36 is cut by the cutting blade 40 when the cutting blade 40 is lowered so as to pass by a surface of a tape receiving plate 41 to be explained later on the opposite side of the side at which the second pressure bonding plate 35 is disposed (refer to FIG. 10).

The binding apparatus 1 includes a tape pressing mechanism (tape retaining part) that grips the distal end of the binding tape 8 that has been pulled out from the reel tape 12. For the tape pressing mechanism, a structure from well-known technology is utilized as is, and as shown in FIGS. 3 and 4, the tape pressing mechanism includes an operating plate 43 that is fixed to the upper mechanism attachment plate 25, a tape receiving plate 41 that is fixed to the second pressure bonding plate 35, a movable plate 45 that is incorporated in a lower mechanism cover 44 fixed to the distal end of the second arm 5 and is operated by the operating plate 43, and a tape pressing plate 46 that is incorporated in the lower mechanism cover 44 and constrains/releases the binding tape 8 between itself and the tape receiving plate 41 in conjunction with the operation of the movable plate 45.

As would be easily understood by those skilled in the art, in the tape pressing mechanism, when the movable plate 45 is pushed in the downward direction by the operating plate 43 during binding, this triggers the tape pressing plate 46 to operate to constrain the binding tape 8 by digging its distal end into the binding tape 8 between itself and the tape receiving plate 41, and thereby the binding tape 8 is constrained. On the other hand, when the movable plate 45 is pushed in the downward direction by the operating plate 43 during cutting of the binding tape 8, this triggers the tape pressing plate 46, whose distal end is digging into the binding tape 8, to be pulled out from the binding tape 8. As shown in FIG. 4, a slit 42 for receiving the distal end of the tape pressing plate 46 is provided in the tape receiving plate 41.

Figure 4:
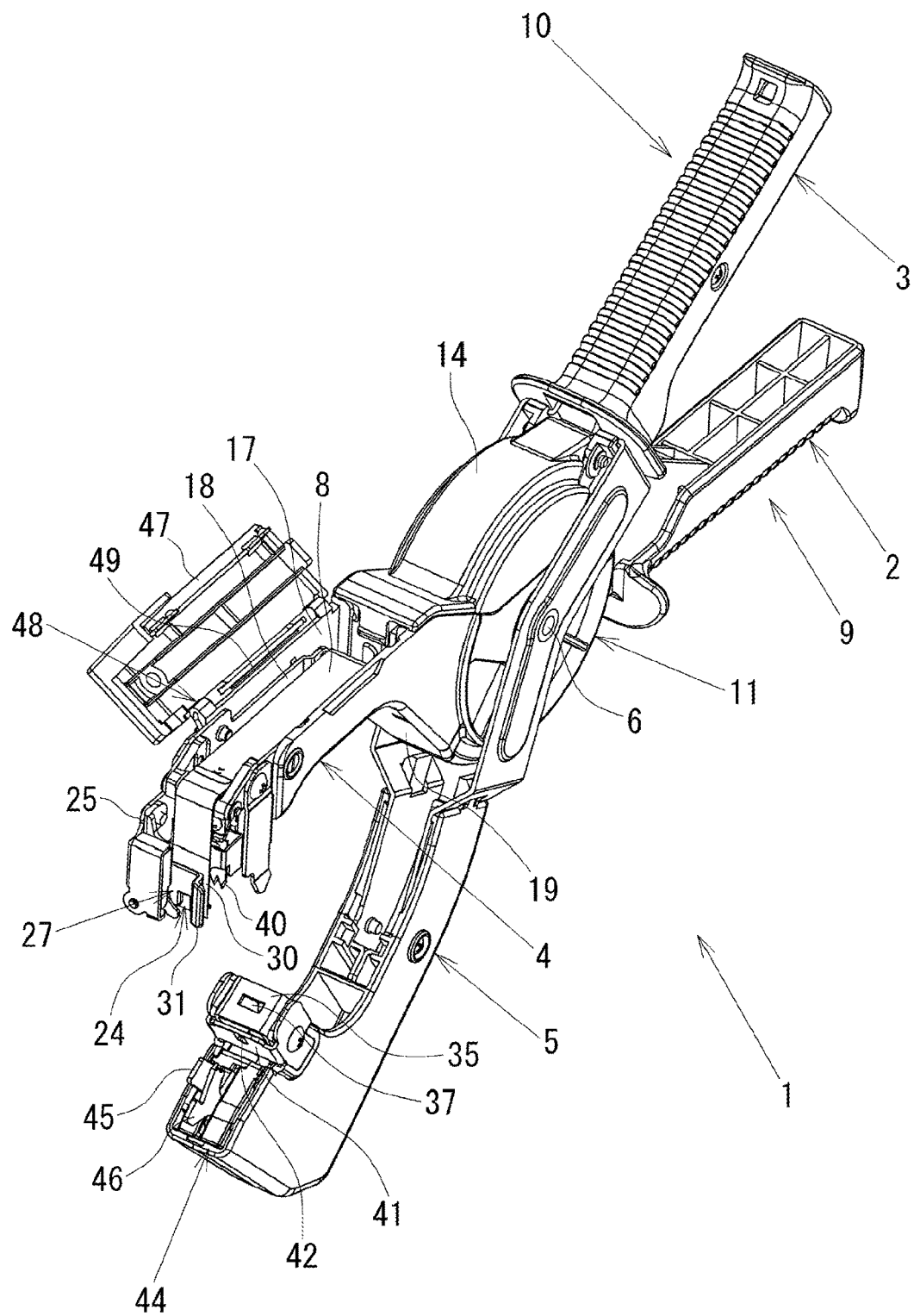
FIG. 4 is a perspective view of the binding apparatus according to the embodiment, and particularly illustrates a state in which a third tape cover is opened.

As shown in FIG. 4, the binding apparatus 1 includes a third tape cover 47 that is attached to a top end of the side wall 17 of the first arm 4 by a hinge 48 such that it can open/close and constitutes a top part (top plate) of the first arm 4. In the binding apparatus 1, by rotating the third tape cover 47 around a metal shaft 49 that constitutes the hinge 48 to place the third tape cover 47 in an opened state (refer to FIG. 4), the second section 22 and the third section 23 of the tape path 20 (refer to FIG. 2) are revealed. In FIGS. 3 and 4, the third tape cover 47 is divided into a portion that covers the second section 22 of the tape path 20 and a portion that covers the third section 23 of the tape path 20, but the third tape cover 47 may be formed integrally.

Next, the operation of the present embodiment will be explained.

Herein, a case will be explained in which the binding apparatus 1 described above is used to, for example, bind a grape vine and a trellis. Thus, when the object to be bound 7 is farm produce, a self-adhesive adhesive tape that has a high self-adhesive force and does not adhere to the object to be bound 7 is preferably used as the binding tape 8. More specifically, the following properties are desired for the binding tape 8: a 180° peel adhesion strength from a stainless steel testing plate as prescribed in the adhesion strength test from a stainless steel testing plate stipulated in JISZ0237 of less than 2.0 N/10 mm, and a self-adhesive force by butted seams of 6.0 N/10 mm or more.

Herein, the self-adhesive force is a peel adhesion strength at a peeling angle of 90°, and the testing conditions such as temperature and humidity, testing speed, and pressure bonding conditions are as prescribed in JISZ0237. Further, butted seams are created by adhering the adhesive surface of the same adhesive tape to itself as is well known by those skilled in the art. Further, the binding tape 8 is preferably photo-degradable so that it becomes brittle after a certain period of time has passed due to absorbing light energy. In particular, in the present embodiment, the binding tape 8 is designed so that it becomes brittle after 200 hours have passed in a xenon beam irradiation test. In addition, since a high self-adhesive force is desired, a rubber-based adhesive is preferable, but the adhesive is not limited thereto.

First, the first tape cover 14 (tape cover) is opened to form an opening in the top part of the tape accommodating part 11. The reel tape 12 (the binding tape 8 in a wound state attached to the tape reel) is inserted from the opening, and the reel tape 12 is mounted on the spool 13 (tape supporting part). Next, in a state in which the first tape cover 14 and the third tape cover 47 are opened, the binding tape 8 is pulled out from the reel tape 12, and the binding tape 8 that has been pulled out is passed over the first roller 15 and the second roller 16 and then passed through the tape dispensing part 24. At this time, in the present embodiment, by sliding the distal end of the binding tape 8 to the side (in the width direction of the binding tape 8) and inserting the distal end of the binding tape 8 from the opening 30 between the first guide plate 26 and the second guide plate 27 of the tape dispensing part 24, the binding tape 8 can be easily passed through the tape dispensing part 24.

Figure 5:
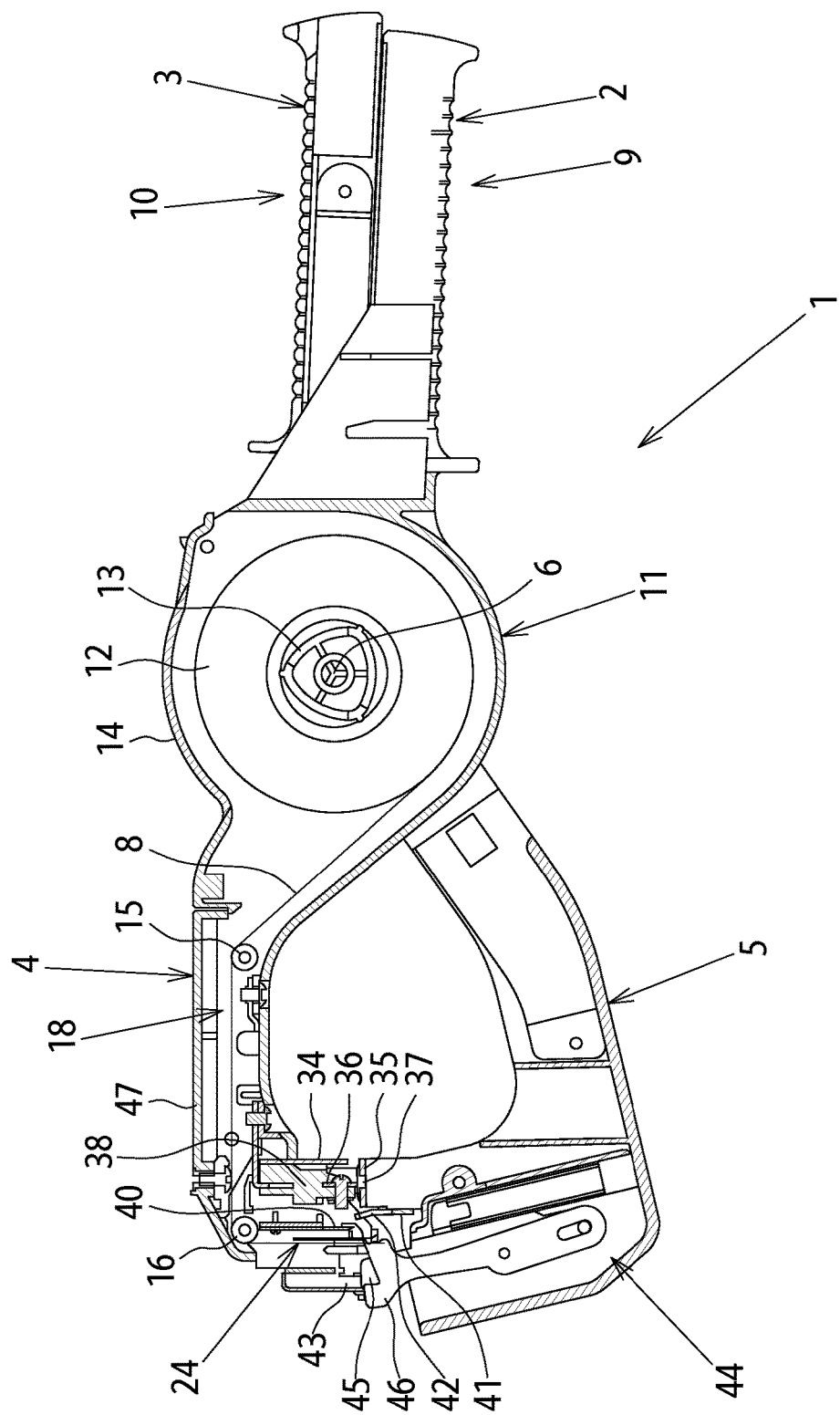
FIG. 5 is an explanatory view of the operation of the binding apparatus according to the embodiment, and illustrates a state in which a pair of arms has reached a rotation end position of a closing operation.
Figure 6:
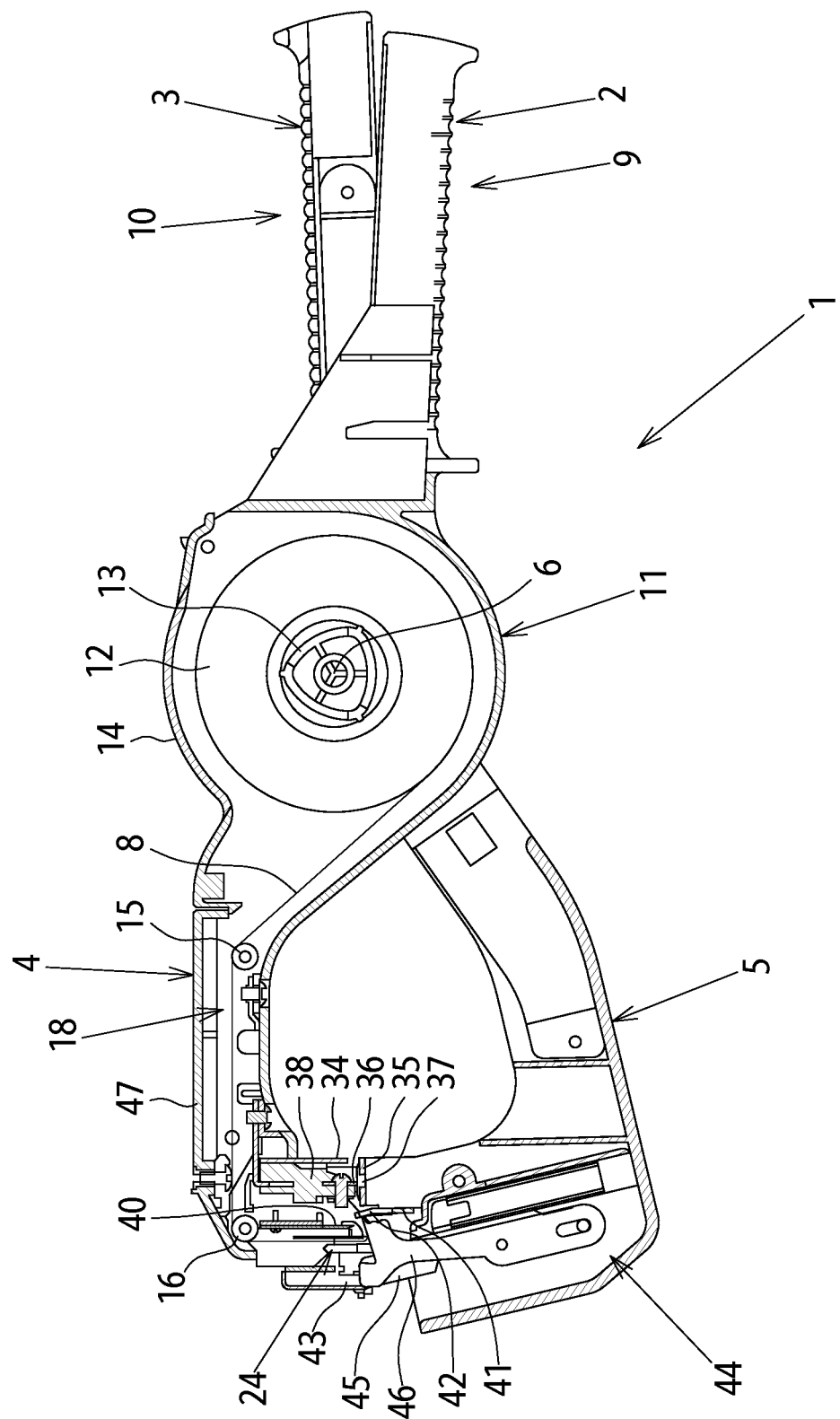
FIG. 6 is an explanatory view of the operation of the binding apparatus according to the embodiment, and illustrates a state in which a binding tape is constrained by a tape pressing plate on a second arm side at a timing when a pair of levers have been slightly returned from the state shown in FIG. 5.

As shown in FIG. 2, after passing the distal end of the binding tape 8 through the tape dispensing part 24, all of the covers including the first tape cover 14 and the third tape cover 47 are closed. Next, the pair of levers 2 and 3 of the binding apparatus 1 in the state shown in FIG. 2 are gripped and squeezed to rotate (closing operation) the pair of arms 4 and 5 around the fulcrum 6. As is well known, by slightly returning the pair of levers 2 and 3 after the pair of arms 4 and 5 have reached the rotation end position (refer to FIG. 5) of the closing operation, the distal end of the tape pressing plate 46 of the tape pressing mechanism (tape retaining part) enters into the slit 42 of the tape receiving plate 41 from above the binding tape 8 as shown in FIG. 6. Thereby, the distal end of the binding tape 8 is gripped between the tape pressing plate 46 and the tape receiving plate 41.

Figure 7:
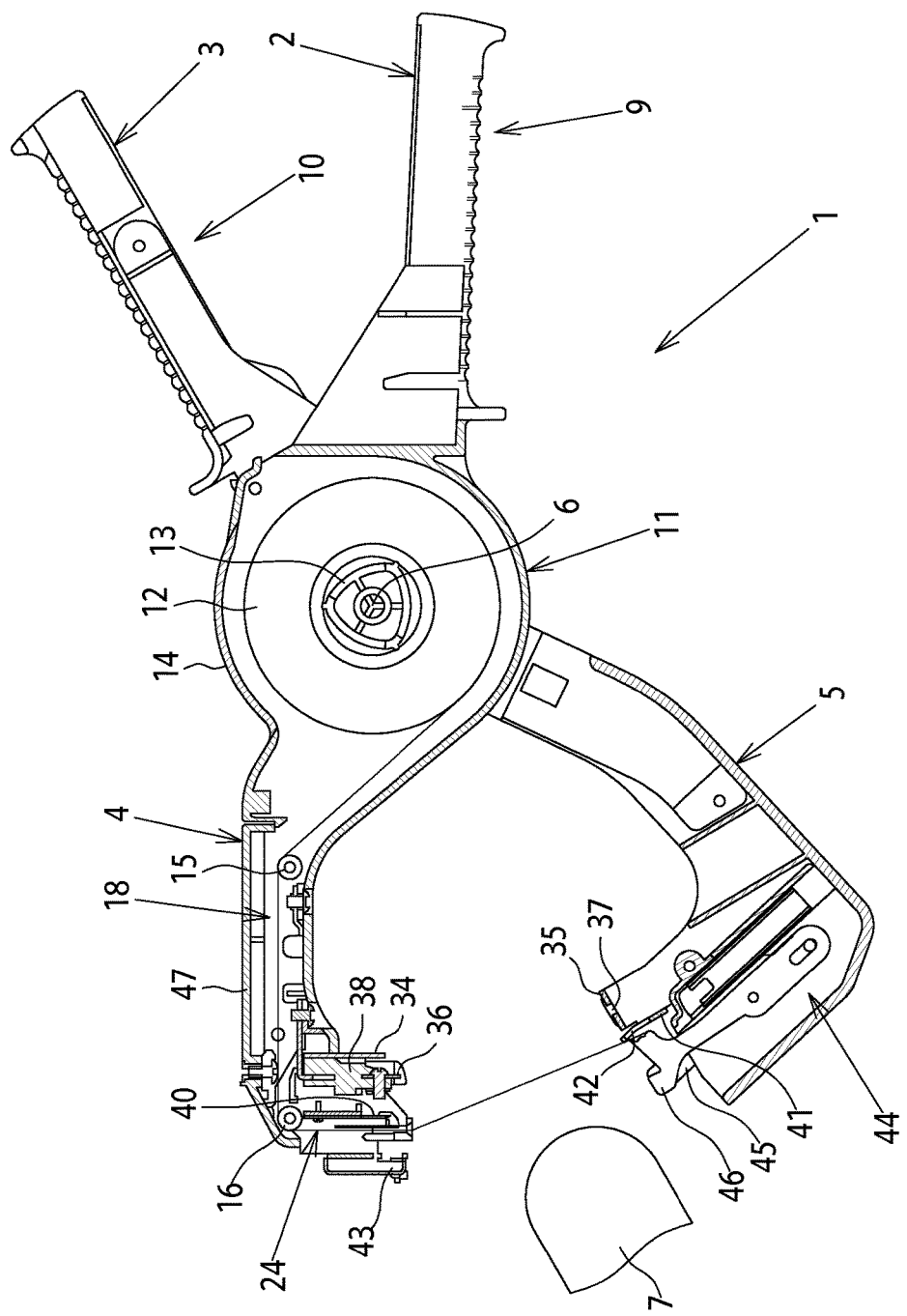
FIG. 7 is an explanatory view of the operation of the binding apparatus according to the embodiment, and illustrates a state in which the binding tape is stretched between the pair of arms.

By returning the pair of levers 2 and 3 to the rotation end position (refer to FIG. 7) of the opening operation, the binding tape 8 that has been pulled out from the reel tape 12 becomes stretched between the pair of arms 4 and 5, or in other words between the tape dispensing part 24 and the tape pressing mechanism as shown in FIG. 7. Further, by moving the binding apparatus 1 toward the object to be bound 7 from the state shown in FIG. 7, the binding tape 8 stretched between the pair of arms 4 and 5 is pushed toward the fulcrum 6 by the object to be bound 7 as shown in FIG. 8, and the object to be bound 7 is induced between the pair of arms 4 and 5.

Figure 8:
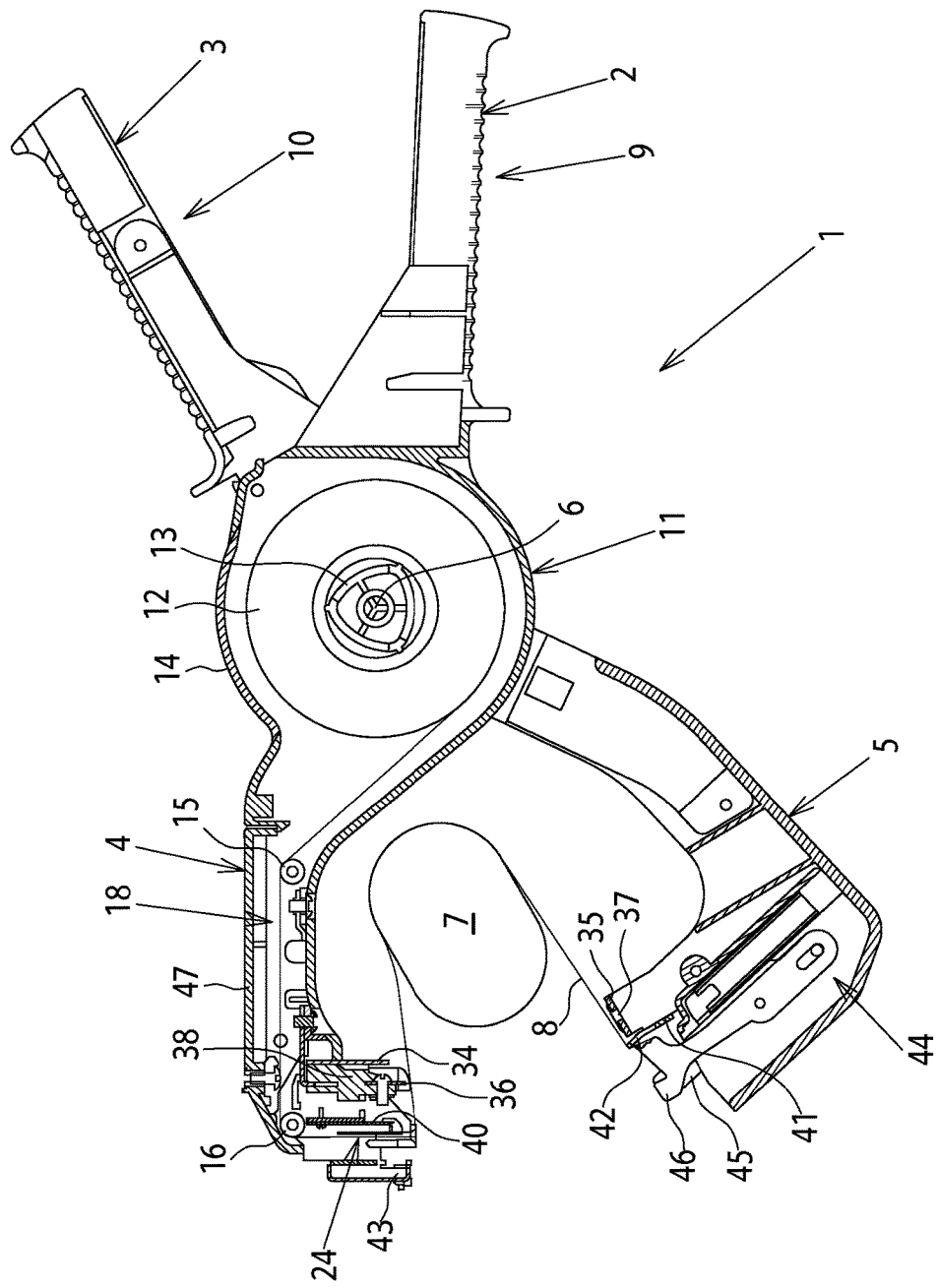
FIG. 8 is an explanatory view of the operation of the binding apparatus according to the embodiment, and illustrates a state in which an object to be bound is induced between the pair of arms from the state shown in FIG. 7.

Next, from the state shown in FIG. 8, the pair of levers 2 and 3 are gripped and squeezed. Thereby, the convex portion on the distal end of the tape pressing plate 36 is inserted into the square hole 37 of the second pressure bonding plate 35 from above the joining portion 33 of the binding tape 8 at a timing shown in FIG. 9 immediately before the pair of arms 4 and 5 reach the rotation end position (refer to FIG. 10) of the closing operation. As a result, the joining portion 33 of the binding tape 8 that has been wound around the object to be bound 7 is strongly gripped by the tape pressing plate 36. Pressure is then applied to the joining portion 33 of the binding tape 8 between the pair of pressure bonding plates 34 and 35 of the pressure bonding mechanism to fasten the joining portion 33 together at a timing shown in FIG. 10 when the pair of arms 4 and 5 reach the rotation end position of the closing operation. Simultaneously, the binding tape 8 that is gripped by the tape pressing plate 36 is cut by the cutting blade 40 of the cutting mechanism near the joining portion 33.

The effects of the present embodiment will now be explained below.

According to the present embodiment, a pressure bonding mechanism is provided in which, by gripping and squeezing the pair of levers 2 and 3 to rotate the pair of arms 4 and 5 around the fulcrum 6, pressure is applied to the joining portion 33 of the binding tape 8 that has been wound around the object to be bound 7 by the pair of pressure bonding plates 34 and 35 to fasten the joining portion 33 together. Therefore, in the so-called plier-type binding apparatus 1, an adhesive tape in which one side is an adhesive surface can be used as the binding tape 8.

Thereby, any mixing of metal staples into the object to be bound 7 as in the conventional binding apparatus, in which the joining portion of the non-adhesive tape was fastened by a staple, is eliminated, and thus the quality of the object to be bound 7 can be ensured.

In the binding apparatus 1 of the present embodiment, since the joining portion 33 of the binding tape 8 is fastened together by the adhesive force of the adhesive surface of the binding tape 8, the need for a strong grip strength like that when ejecting a metal staple is eliminated when applying pressure to the joining portion 33 of the binding tape 8 by the pair of pressure bonding plates 34 and 35 of the pressure bonding mechanism. Thereby, the burden on the operator can be decreased, and in turn the work efficiency can be improved.

In the binding apparatus 1 of the present embodiment, since a heavy mechanism for ejecting a staple that was utilized in the conventional plier-type binding apparatus is not necessary, the weight of the apparatus can be considerably decreased.

In the binding apparatus 1 of the present embodiment, compared to the conventional plier-type binding apparatus, the binding tape 8 can be disposed in the space in which the mechanism for ejecting a staple was disposed. Therefore, the size of the apparatus can be reduced and the weight balance of the apparatus can be optimized, and thereby the operability (workability) of the apparatus can be improved.

In this way, according to the binding apparatus 1 of the present embodiment, since the weight of the apparatus can be reduced and the operability of the apparatus can be improved, in particular, in an operation in which the burden on the operator is extremely large, such as binding the vines of grapes, kiwi fruits, and the like to a trellis overhead, the burden on the operator can be greatly reduced, and thus the efficiency of the binding operation can be greatly improved.

Compared to the conventional plier-type binding apparatus in which the cover for accommodating the binding tape 8 was provided on a grip end, the tape path 20 can be greatly shortened. Thereby, the pulling resistance when pulling out the binding tape 8 from the reel tape 12 can be greatly reduced, and thus the binding tape 8 can be smoothly pulled out from the reel tape 12.

Further, in the conventional plier-type binding apparatus, for example, when exchanging the reel tape 12, the binding tape 8 may come out from the normal tape path and become stuck in the cover. However, in the binding apparatus 1 of the present embodiment, the binding tape 8 does not easily come out from the tape path 20 due to the considerable shortening of the tape path 20, and thus the reel tape 12 can be easily and quickly exchanged.

In the conventional plier-type binding apparatus, since the contact point P between the binding tape 8 that has been pulled out from the reel tape 12 and the reel tape is disposed at a higher position than the tape path 20, the adhesive surface of the binding tape 8 contacts a guiding surface (outer periphery) of the first roller 15. Thus, the pulling resistance when pulling out the binding tape 8 from the reel tape 12 was increased. However, in the binding apparatus 1 of the present embodiment, the contact point P between the binding tape 8 that has been pulled out from the reel tape 12 and the reel tape 12 is disposed at a lower position than the tape path 20, and thus the non-adhesive surface of the binding tape 8 contacts the guiding surface (outer periphery) of the first roller 15. Thereby, the pulling resistance when pulling out the binding tape 8 from the reel tape 12 can be greatly reduced, and thus the binding tape 8 can be smoothly pulled out from the reel tape 12.

In the binding apparatus 1 of the present embodiment, by sliding the distal end of the binding tape 8 to the side (in the width direction of the binding tape 8), the distal end of the binding tape 8 can be inserted from the opening 30 between the first guide plate 26 and the second guide plate 27 of the tape dispensing part 24, and thus the binding tape 8 can be easily and reliably passed through the tape dispensing part 24.

In the binding apparatus 1 of the present embodiment, the third tape cover 47 that constitutes a top part of the first arm 4 is attached to the side wall 17 of the first arm 4 by a hinge 48 that has a metal shaft 49. Therefore, compared to the conventional plier-type binding apparatus which used a plastic hinge, the rigidity of the hinge structure of the third tape cover 47, which is repeatedly opened and closed, can be enhanced.

In the binding apparatus 1 of the present embodiment, 50% or more of the surface area of the first tape cover 14 is constituted by a transparent material, and thus the remaining amount of the reel tape 12 within the tape accommodating part 11 that is supported by the spool 13 (tape supporting part) can be easily confirmed in a state in which the first tape cover 14 is closed. Therefore, the operability can be improved.

In the binding apparatus 1 of the present embodiment, a self-adhesive adhesive tape is used for the binding tape 8, and the 180° peel adhesion strength from a stainless steel testing plate is less than 2.0 N/10 mm. Thereby, the binding operation can be smoothly carried out because the binding tape 8 does not become adhered to the object to be bound 7 by an adhesive force that is stronger than the adhesive force necessary for binding.

Further, by setting the self-adhesive force of the binding tape 8 to 6.0 N/10 mm or more, the joining portion 33 (butted seam portion) of the binding tape 8 can be prevented from unexpectedly coming apart.

In addition, since the binding tape 8 is designed so that it becomes brittle after 200 hours have passed in a xenon beam irradiation test, the binding tape 8 can be made to become brittle in accordance with the harvest period (in the present embodiment, the harvest period of grapes), and thus the post-processing such as recovering the binding tape 8 is simple.

REFERENCE SIGNS LIST 1 binding apparatus
2 first lever
3 second lever
4 first arm
5 second arm
6 fulcrum
7 object to be bound
8 binding tape
34 first pressure bonding plate (first pressure bonding member)
35 second pressure bonding plate (second pressure bonding member)
33 joining portion

The invention claimed is:

1. A binding apparatus comprising:
a pair of arms that are rotated around a fulcrum by gripping and squeezing a pair of levers;
a tape supporting part that supports a binding tape so that it can be pulled out; a tape dispensing part that is provided on one of the arms and dispenses the binding tape that has been pulled out from the tape supporting part; and
a tape retaining part that is provided on the other arm and retains an end of the binding tape that has been dispensed from the tape dispensing part, wherein
an object to be bound that has been induced between the pair of arms is bound by the binding tape that is stretched between the pair of arms, the binding tape is an adhesive tape,
the binding apparatus comprises a pressure bonding mechanism in which a joining portion of the binding tape is pressure bonded by cooperation of a first pressure bonding member that is provided on the one arm and a second pressure bonding member that is provided on the other arm, and
the tape supporting part supports the binding tape in a wound state that is attached to a tape reel so that it can be pulled out, and the fulcrum of the pair of arms is disposed on a support axis of the tape supporting part.

2. The binding apparatus according to claim 1, wherein in a state in which the pair of arms are disposed in an up-down direction, an end point on a tape supporting part side of the binding tape that has been pulled out from the tape supporting part is disposed at a lower position than a tape path that extends along the one arm that is disposed on a top side among the pair of arms.

3. The binding apparatus according to claim 1, wherein
the tape dispensing part comprises a first guide part that guides a non-adhesive surface of the binding tape,
a second guide part that faces an adhesive surface of the binding tape, a third guide part that guides one side in a width direction of the binding tape, and
an opening that is opened to reveal the third guide part.

4. The binding apparatus according to claim 1, comprising:
a tape accommodating part that accommodates the binding tape;
an opening that is provided on the tape accommodating part and formed so as to reveal the binding tape that is supported on the tape supporting part; and
a tape cover that is provided on the tape accommodating part and covers the opening, wherein
50% or more of a surface area of the tape cover is constituted by a transparent material.

5. The binding apparatus according to claim 1, wherein the binding tape is a self-adhesive adhesive tape, a 180° peel adhesion strength from a stainless steel testing plate of the binding tape is less than 2.0 N/10 mm, and a self-adhesive force of the binding tape is 6.0 N/10 mm or more.

6. The binding apparatus according to claim 2, wherein
the tape dispensing part comprises a first guide part that guides a non-adhesive surface of the binding tape,
a second guide part that faces an adhesive surface of the binding tape, a third guide part that guides one side in a width direction of the binding tape, and
an opening that is opened to reveal the third guide part.

7. The binding apparatus according to claim 2, comprising:
a tape accommodating part that accommodates the binding tape;
an opening that is provided on the tape accommodating part and formed so as to reveal the binding tape that is supported on the tape supporting part; and
a tape cover that is provided on the tape accommodating part and covers the opening, wherein 50% or more of a surface area of the tape cover is constituted by a transparent material.

8. The binding apparatus according to claim 3, comprising:
- a tape accommodating part that accommodates the binding tape;
- an opening that is provided on the tape accommodating part and formed so as to reveal the binding tape that is supported on the tape supporting part; and
- a tape cover that is provided on the tape accommodating part and covers the opening, wherein
- 50% or more of a surface area of the tape cover is constituted by a transparent material.

9. The binding apparatus according to claim 2, wherein the binding tape is a self-adhesive adhesive tape, a 180° peel adhesion strength from a stainless steel testing plate of the binding tape is less than 2.0 N/10 mm, and a self-adhesive force of the binding tape is 6.0 N/10 mm or more.

10. The binding apparatus according to claim 3, wherein the binding tape is a self-adhesive adhesive tape, a 180° peel adhesion strength from a stainless steel testing plate of the binding tape is less than 2.0 N/10 mm, and a self-adhesive force of the binding tape is 6.0 N/10 mm or more.

11. The binding apparatus according to claim 4, wherein the binding tape is a self-adhesive adhesive tape, a 180° peel adhesion strength from a stainless steel testing plate of the binding tape is less than 2.0 N/10 mm, and a self-adhesive force of the binding tape is 6.0 N/10 mm or more.

\* \* \* \* \*